United States Patent [19]

Norbury, Jr. et al.

[11] Patent Number: 4,892,288

[45] Date of Patent: Jan. 9, 1990

[54] AIR FLOW LOUVER SYSTEM

[75] Inventors: Raymond L. Norbury, Jr., Dallas; John W. Baker, De Soto; Vernon L. Poynter, Bedford, all of Tex.

[73] Assignee: Cary Products Co., Inc., Dallas, Tex.

[21] Appl. No.: 270,833

[22] Filed: Nov. 14, 1988

[51] Int. Cl.$^4$ .................... F16K 1/226; F24F 13/14
[52] U.S. Cl. ................................ 251/306; 98/40.29; 98/41.1
[58] Field of Search ............... 251/305, 306; 98/2, 98/40.29, 41.1

[56] References Cited

U.S. PATENT DOCUMENTS

| | | | |
|---|---|---|---|
| 2,285,829 | 6/1942 | Maage, Jr. | 251/305 X |
| 2,342,877 | 2/1944 | Maage, Jr. | 251/305 X |
| 2,864,301 | 12/1958 | Katz | 98/40.29 |
| 3,683,787 | 8/1972 | Cary | 98/40.29 |
| 3,724,812 | 4/1973 | Richardson | 251/306 |
| 3,804,366 | 4/1974 | Rubright | 251/305 |
| 4,351,511 | 9/1982 | Garrigues | 251/306 X |
| 4,402,486 | 9/1983 | Jacquet | 251/306 |
| 4,492,361 | 1/1985 | Jacquet et al. | 251/306 X |

FOREIGN PATENT DOCUMENTS 1347978  2/1974  United Kingdom ........... 98/40.29

*Primary Examiner*—John Rivell
*Attorney, Agent, or Firm*—T. D. Copeland

[57] ABSTRACT

An adjustable louver unit for controlling the quantity and/or direction of the air flow in air systems, such as heaters, air conditioners and the like. This louver unit includes a rotary vane assembly having a central longitudinal shaft. A blade perpendicular and radial to the shaft, and containing circular vanes projecting from the blade and at an angle to the longitudinal axis of the central shaft. This entire rotary vane array, comprising a single member is molded from a continuous unitary material having a central shaft, a radial blade and a plurality of vanes, all having been formed from flexible plastic resin, which provides for ease of assembly, durability, simplicity, and efficiency of operation.

The vane array is installed in a rigid louver frame, (having concentrically curved inner longitudinal surfaces), in a manner to permit simplicity of installation, and ease of directional adjustment, and without the need for conventional sealing materials of any kind, such as felt, or foamed rubber strips glued to the bezel and thus shutting the air off when the edges of the central blade of the rotor come in contact with the felt or foam strips to permit complete shut off of the air flow. In a preferred embodiment the entire rotor vane array may be made of extremely flexible plastic material and the flexible rotor shaft is molded around a stiffener, such as a metal or wood dowel, to permit rotation without twisting.

4 Claims, 2 Drawing Sheets

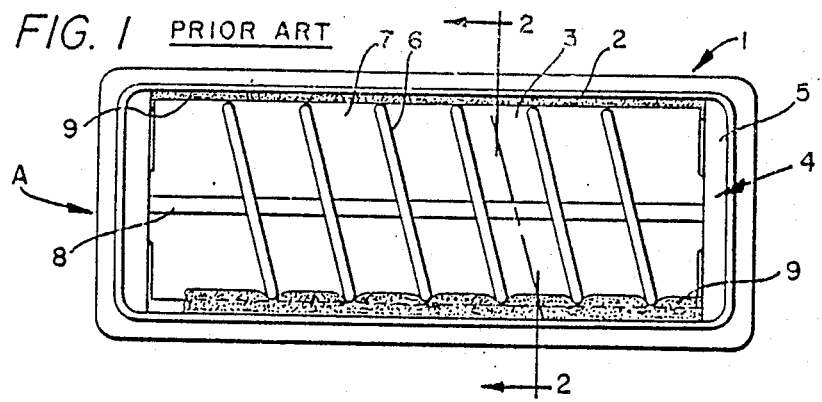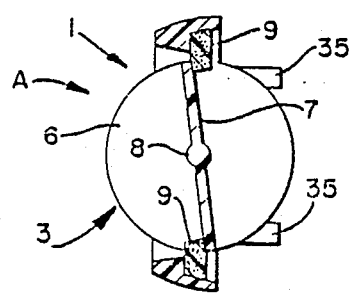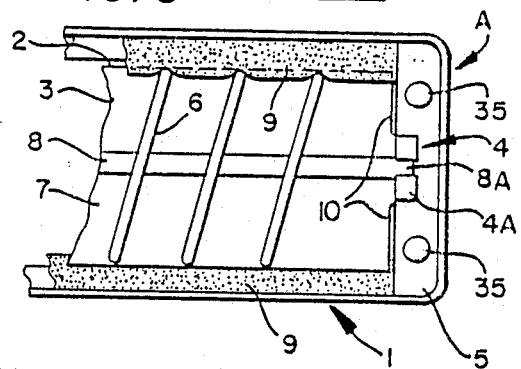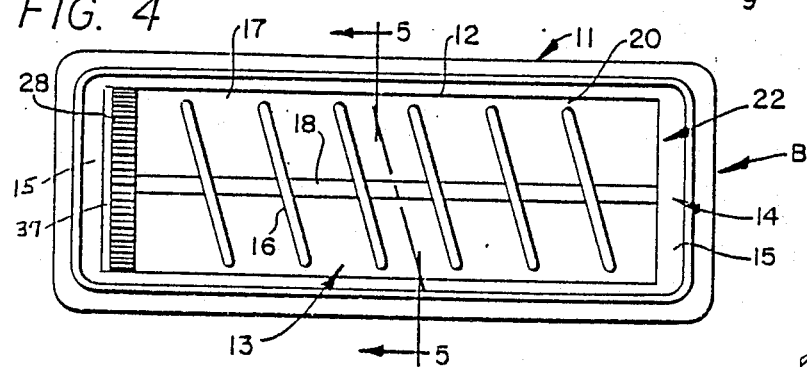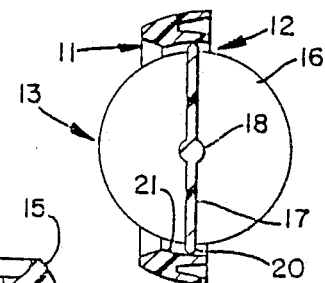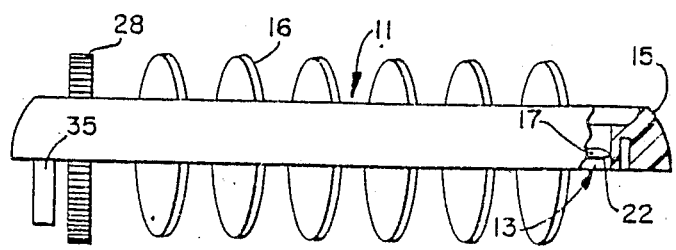

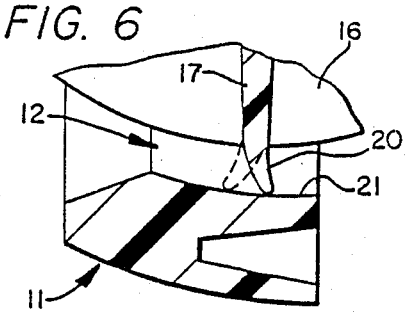
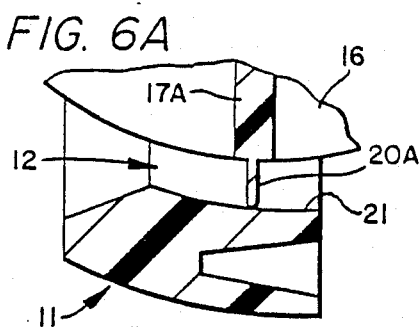
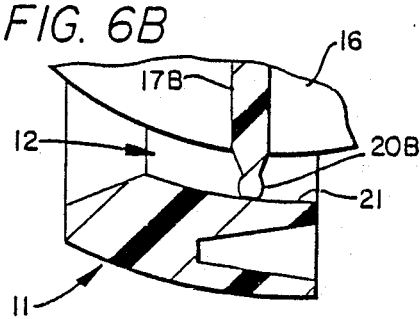
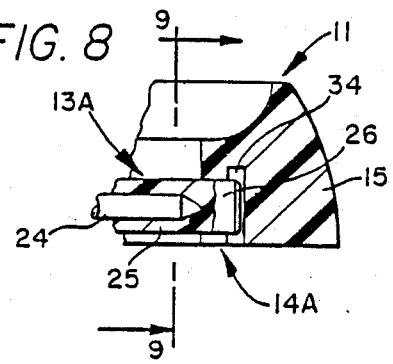
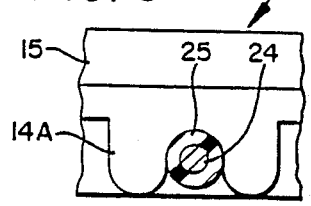
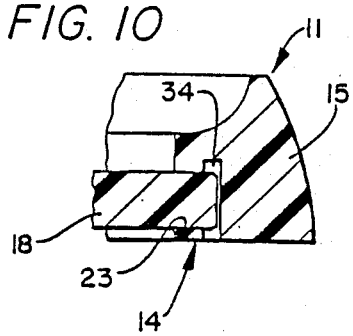
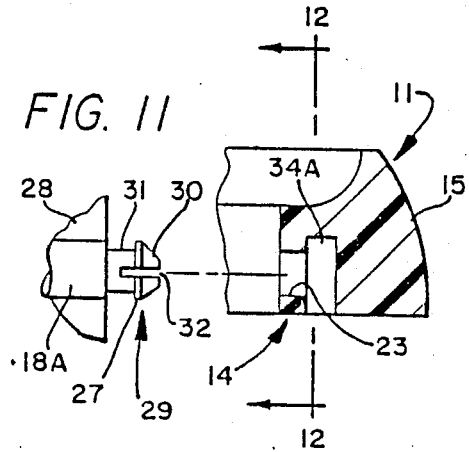
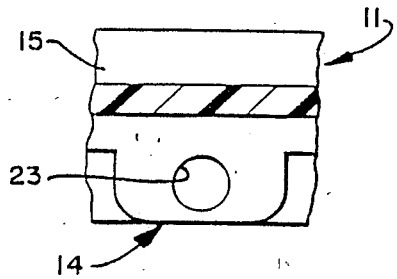

AIR FLOW LOUVER SYSTEM

BACKGROUND OF THE INVENTION

1. Field of the Invention

This invention relates generally to air flow louver units and more particularly to a novel louver unit that provides a full range of air control directions in incremental steps from fully opened to fully closed, by means of a novel flap extension on the rotary blade that suppots the directional vanes.

2. Statement of the Prior Art

The prior art discloses air conditioners with louver units that employ a series of circular or elliptical vanes. Typical, but not exclusively representative of this type of prior art are the patents to A. P. Cary, U.S. Pat. No. 3,683,787, to R. C. First, U.S. Pat. No. 3,252,398, to W. G. Crowle, et al, U.S. Pat. No. 2,853,935, and to Peter Katz, U.S. Pat. No. 2,864,301, and the reference patents cited in the foregoing identified patents. These and other louver units now in use have a similar construction, but only a few of the prior art louvers attempt to obtain a fully shut off condition, combined with a full range of air control by incremental steps. The principal patent that shows a complete shut off condition is one inventor's prior U.S. Pat. No. 3,683,787, which accomplishes this result by the inclusion of an open sided box structure that surrounds the rotary vane assembly of that invention. The drawback to that prior invention was that it required a separate operable part to surround the vane assembly for the sole purpose of providing a complete shut off, whereas the instant invention includes its sealing means as an integral part of the vane assembly, per se', thus eliminating a major part, and providing a simpler, less expensive, and more efficient unit than is found in the prior art.

SUMMARY OF THE INVENTION

The principal object of this invention is to provide a novel louver unit for a fluid flow control system for controlling volume and direction of the fluid (usually air) and wherein the combination of elements and structure employed in this invention provides for the complete elimination of the customary felt, foam rubber, foam plastic, or other sealing material, which are difficult and time consuming to install.

Another object is to provide a flexible rotary vane assembly or array, with a rigid longitudinal shaft that is adapted to utilize the U-shaped bearing holders of the prior art, while maintaining the advantages of the flexible vane assembly or rotor to achieve full shut off without the requirement of added sealing materials of any kind.

A further object is to provide a flexible rotor or vane assembly with a flexible longitudinal shaft or axle, that permits the use of a full circle bearing socket in the louver frame.

These and other objects and advantages will be apparent from the following specification and drawings.

BRIEF DESCRIPTION OF THE DRAWINGS

FIG. 1 represents a front view of a typical air conditioner louver of the prior art;

FIG. 2 is a cross sectional view taken along the lines 2—2 of FIG. 1;

FIG. 3 is a fragmentary back view of the device of FIG. 1;

FIG. 4 is a front view of the improved louver unit of this invention;

FIG. 5 is a cross sectional view taken along the lines 5—5 of FIG. 4;

FIG. 6 is an enlarged fragmentary view of one embodiment taken at the lower end of FIG. 5;

FIG. 6A is similar to FIG. 6 for another embodiment;

FIG. 6B is similar to FIG. 6A for an additional embodiment;

FIG. 7 is a bottom view of the louver unit of FIG. 4, with a small area shown in fragmentary section;

FIG. 8 is an enlarged view of the fragmentary portion of FIG. 7, using a modified embodiment of the axle member;

FIG. 9 is a fragmentary sectional view taken along the lines of 9—9 of FIG. 8;

FIG. 10 is a view similar to FIG. 8, showing another embodiment of the shaft at its mounting connection;

FIG. 11 is a view similar to FIGS. 8 and 10, showing a third shaft mounting construction;

FIG. 12 is a sectional view taken along the lines 12—12 of FIG. 11.

DESCRIPTION OF PRIOR ART EXAMPLE

FIGS. 1–3 as described above are representative of the prior art construction, from which the present invention, shown in FIGS. 4–12, will be seen to provide definitive advances to this art.

Prior art louvers, shown in general at A in FIG. 1, include a holding frame 1 defining a rectangular opening 2 (through which fluid passes as it is being controlled as to volume and direction) with rotor or vane 3 mounted at 4 in the frame ends 5 for rotation in the opening 2. A plurality of circular discs 6 are integrally molded in the rotary vane assembly 3 and normal to the blade surface 7, but at an angle to the longitudinal axis of the rotor axle or shaft 8. These circular discs 6 are substantially the same width as the blade surface 7. Rotor 3 may be manually rotated by the user to vary or change the direction of air flow through this louver unit. This rotor may be rotated 360 degrees in either direction to control and direct the air flow out of the air conditioner or other device it is being used with. However, the length and width of the prior art louver blade surface 7 are less than the corresponding dimensions of the frame opening 2, so it is necessary to install felt, foam rubber, fabric or other material sealer 9 around the entire inner periphery of the opening 2 in the frame 1, if a complete shut off is desired when the blade is in its vertical position. Since the discs 6 extend substantially the full width of the blade surface 7 on which they are installed, and since the rotor 3 must be free to rotate in the opening 2, this separate compressible material sealer 9 is essential to the proper operation of louver A.

DESCRIPTION OF PREFERRED EMBODIMENTS

Louver B, as shown in FIGS. 4–12, includes similar basic parts as louver A of FIG. 1, and includes improvements, modifications and additions necessary to increase the beneficial results obtained by the user, and to decrease the costs incurred by the manufacturer.

New louver B includes a rigid holding frame 11 with a central fluid opening or window 12 (to receive fluid from its back side, and direct it out its front side), and a rotor vane assembly, or rotor 13 mounted at 14 in the frame ends 15. The rotor 13 includes a plurality of circular discs 16 molded with the blade 17 and at an angle to the longitudinal axis of shaft 18. However, these discs 16 do not extend to the full width of the rotor blade 17, so that a portion of the blade, identified as flexible tip extension 20, now extends beyond the effective lateral width of the discs 16, and acts to seal the peripherial opening 12 around the discs 16 when the blade 17 is in its closed position, as in FIG. 5. This closure action is made more effective by the use of the contoured concentric inner edge 21 of frame 11 that resides in the peripherial opening 12, and permits a flush engagement with tip portion 20.

The lateral ends 22 of rotor blade 17, (see FIG. 7), are of a dimension to slightly drag on the housing ends 15, and completely close the usual open space 10, as in FIG. 3, between the ends of rotor 3 and the housing ends 5 of the prior art louver A. Since rotor 13 of the instant invention, louver B, is made of flexible plastic or equivalent material, the rotor ends 22 are of the same material, and are thus adapted to exert a slight dragging action when engaging housing end 15 in frame 11. The opposite rotor end is equipped with turning wheel 28, which also drags against its end 15, for the same purpose of providing a complete shut off when the rotor blade is in position of full cut off. There is an even more pronounced dragging action that occurs between the blade extensions 20 and the concentrically curved inner surface 21 of the longitudinal portion of the rigid holding frame or housing 11 of louver B. This action, as seen in FIG. 6, resembles the action of the extending rubber flap in a revolving door, except that in this instance, the flexible tip extension 20 provides a seal in both directions of rotation of rotor 13, whereas, a revolving door is designed for one direction of rotation only, and normally has no seal at all at its vertical ends. The preferred embodiment is shown in FIG. 6, and alternate embodiments are seen in FIGS. 6A and 6B, although all embodiments provide for a full cut off of air flow. The flexible tip extension 20 is slightly longer than the knife blade tip 20A, or the bulb tip 20B, but each tip provides an element of drag when moving across the concentrically curved surface 21, and each provides a full cut off of air flow by this surface.

Prior art louvers using rigid materials could not provide an air shut off at a marketable cost because of the difficulty of molding parts with a close enough fit between the rotor and frame to prevent leakage. In contrast the present invention, using a blade with an inherent flexible tip to seal with its mounting frame or bezel, no separate sealing material is needed. In a preferred embodiment, the rotor is made of extremely flexible material, but a stiffener, such as a metal or wood dowel or an insert of rigid plastic, approximately ⅛" dia., is employed as an integral element of the shaft. By employing a material with the correct degree of flexibility, the rotor blade will both direct air and seal properly.

In a preferred embodiment, the entire rotor vane assembly 13 is made of flexible plastic material, so that its central axle or shaft 18 can be longer than the longitudinal dimension of the open space between the end walls 15 and still engage an enclosed circular socket 23. By sufficiently flexing the rotor 13 and its axle 18, the 'arrowhead' tips 29 at each end of the axle 18 may be readily passed through the circular socket 23. Once the tip 29 has passed through the circular socket 23, an enlarged, but compressible shoulder 27 expands to keep the engagement of rotor 13 snug, but rotatable within frame 11. The conical surface 30 of FIG. 11 permits the arrowhead tip 29 to easily pass through the circular opening of socket 23.

In an alternate preferred embodiment, as seen in FIG. 8, the central axle 25 comprises a rigid central axial member 24, such as a small diameter wooden dowel, metal pin, or similar article that is inserted in the mold used for casting the rotor 13A, so that in the finished product, the now rigid axle 25 is embedded in the flexible plastic material or rubber rotor 13A for substantially the full length thereof. In this embodiment, the sockets 14A are "u-shaped" to receive the free (non-arrowhead) ends 26 of axle 25. FIG. 9 shows this U-shaped socket 14A with shaft 25 (including pin 24) inserted therein. The fit between the U-shaped opening defined in 14A and the O.D. of shaft 25 is such that a slight pressing force is required to insert or remove shaft 25 and to rotate rotor 13, 13A, relative to housing 11, once the shaft is installed.

FIG. 10 shows the shaft 18 of the embodiment of FIG. 4 installed in its circular bearing and support socket 23 of its mounting member 14. FIG. 11 shows a modified embodiment of the construction shown in FIG. 10, wherein the distal ends 29 of shaft 18A are shaped to resemble an "arrowhead" 29 with a conical surface at 30, and include a reduced diameter channel 31 and a slot 32, whereby this combination of structure permits the flexible shaft 18A to be bent to align arrowhead 29 and opening 23 so that the arrowhead may be forced through this opening and into the free space 34A beyond the member 14. Whereupon, the slot 32 closes or compresses substantially, and arrowhead 29 then expands again back to its normal shape when it reaches the free space 34A. Channel 31 rotates in the opening 23, which then becomes the bearing for shaft 18A to be rotated in. Pins 35 (FIGS. 3 and 7) assist in mounting the louver unit, but form no part of this invention.

While FIG. 12 is a section taken along lines 12—12 of FIG. 11, it can just as well represent a corresponding view of FIG. 10, since each of these embodiments employ a circular socket 23 to receive their corresponding axles 18 or 18A.

A knurled wheel 28 is incorporated onto or molded with the rotor 13, 13A as an integral part to assist in rotating the rotor manually by the user of the automotive air conditioner on which this invention is most likely to be used. This wheel is easier to operate than by trying to turn the rotor per se'. The blade portion 17 in effect extends through the wheel 28 to provide a narrow extension 37 that abutts against its corresponding end member 15 to effectively seal the adjacent opening, which would otherwise be open as at 10 of FIG. 3.

It should be noted that the dimension of the extension 20 which is normally ⅛" or less, may be varied to suit the preference of the consumer as to an easily moved rotor, or to movement that requires varying degrees of resistance to be moved. The rotary fit between the lateral ends 15 of housing frame 11 and the rotor 13, 13A may be adjusted by the dimensions of those cooperating parts, so that the desired drag is still controlled when ends 20 of the flat section 17 are no longer in contact with area 21 of the longitudinal portion of frame 11.

Alternatively, end 15 near wheel 28 utilizes enclosed opening 23 for more stability, and other end 15 utilizes U-opening 14A.

From the foregoing description and examples, it will be seen that there has been produced a device which substantially fulfills the objects of this invention as set forth herein. The invention is not limited to the examplary construction herein shown and described, but may be made in many ways within the scope of the claims.

What is claimed is:

1. In a fluid flow control louver unit, having a holding frame defining an opening therein, with a fluid inlet at its back side and a fluid outlet at its front side, the improvement comprising a flexible unitary material rotor rotatably mounted within said frame for controlling the volume and direction of the fluid passing through said opening, and means for sealing all sides of said opening, and a rigid material wheel for turning said rotor attached to said rotor in said opening.

2. A rotor as in claim 1, ccomprising a longitudinal shaft, a blade portion on said shaft, fluid directing discs on said blade portion, wherein said frame is made of rigid material and includes a concentrically curved inner surface wherein said blade portion is made of flexible material, and includes an inherent tip which drags along said curved surface for improved sealing.

3. A fluid flow control system louver unit comprising in combination:
   a. a rigid material holding frame having a window therein defining a passage for fluid therethrough,
   b. a flexible material rotor having a flexible shaft journalled in said frame for rotation therein,
   c. said frame including end members having enclosed circular shaft sockets providing a through opening in said end members,
   d. arrowhead tips at each distal end of said shaft adapted to be inserted in and pass through said circular sockets to retain said shaft in place while permitting rotation of said shaft and said rotor.

4. A louver unit, comprising in combination:
   a. a rigid material holding frame having a window therein, with a concentrically curved inner surface, to permit fluid passage,
   b. a flexible unitary material rotor journalled to be rotated within said window and said curved inner surface,
   c. a rigid material wheel adapted to permit manual rotation of said rotor, and attached to said rotor within said window,
   d. means on said wheel for sealing one lateral edge of said window,
   e. a blade portion on said rotor, having external longitudinal edges with dimensions greater than the internal dimensions of said surface, and sealing the other lateral edge of said window,
   f. a flexible tip integral with said blade portion at both said longitudinal edges of said rotor, whereby
   g. said tips drag against said inner curved surface to provide a complete shut off of fluid flow through said window.

* * * * *